March 9, 1937. H. C. MOULTON 2,073,219
FUR CUTTING MACHINE
Filed Sept. 13, 1935 9 Sheets-Sheet 1
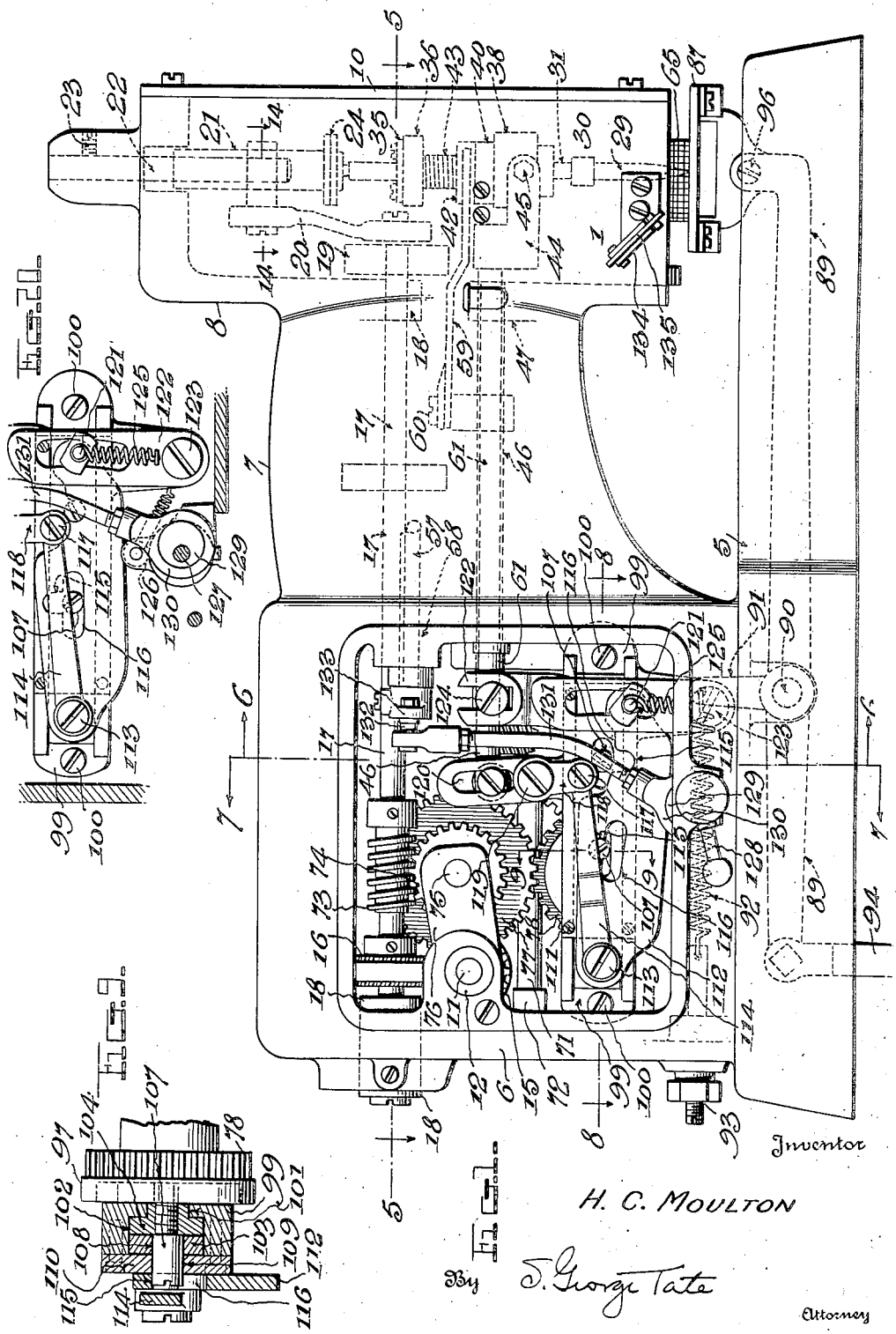
Inventor
H. C. Moulton
By S. George Tate
Attorney

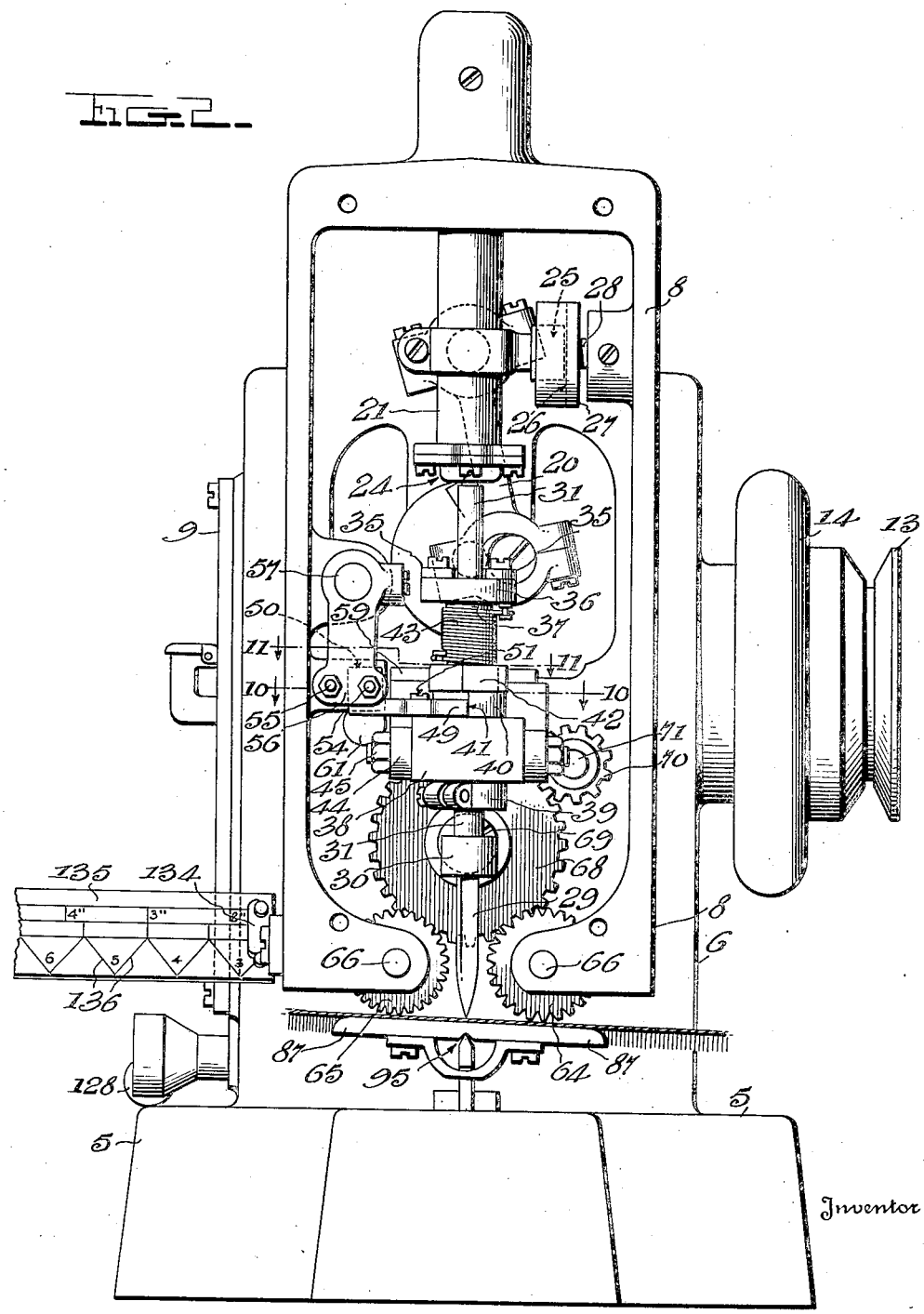

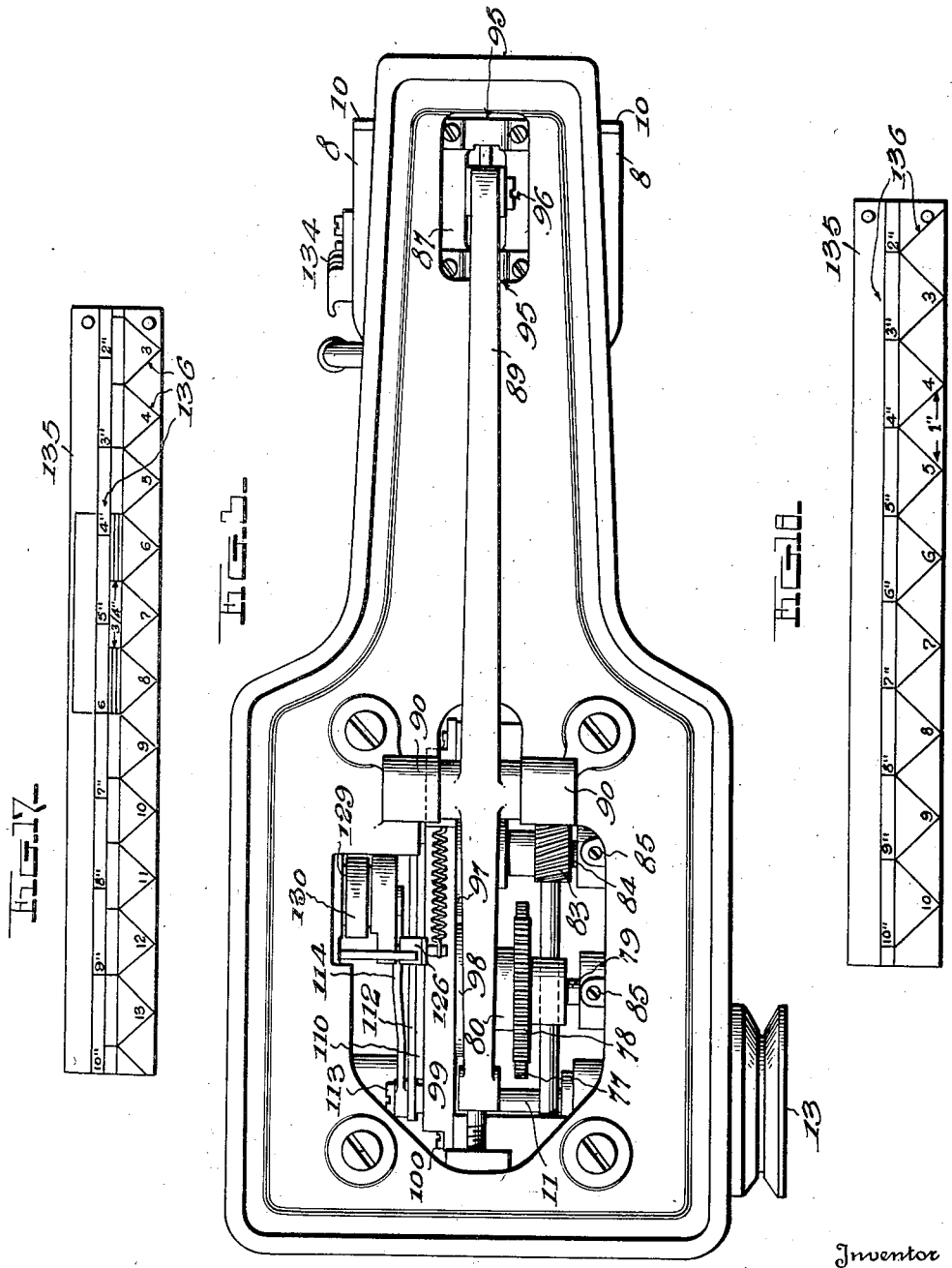

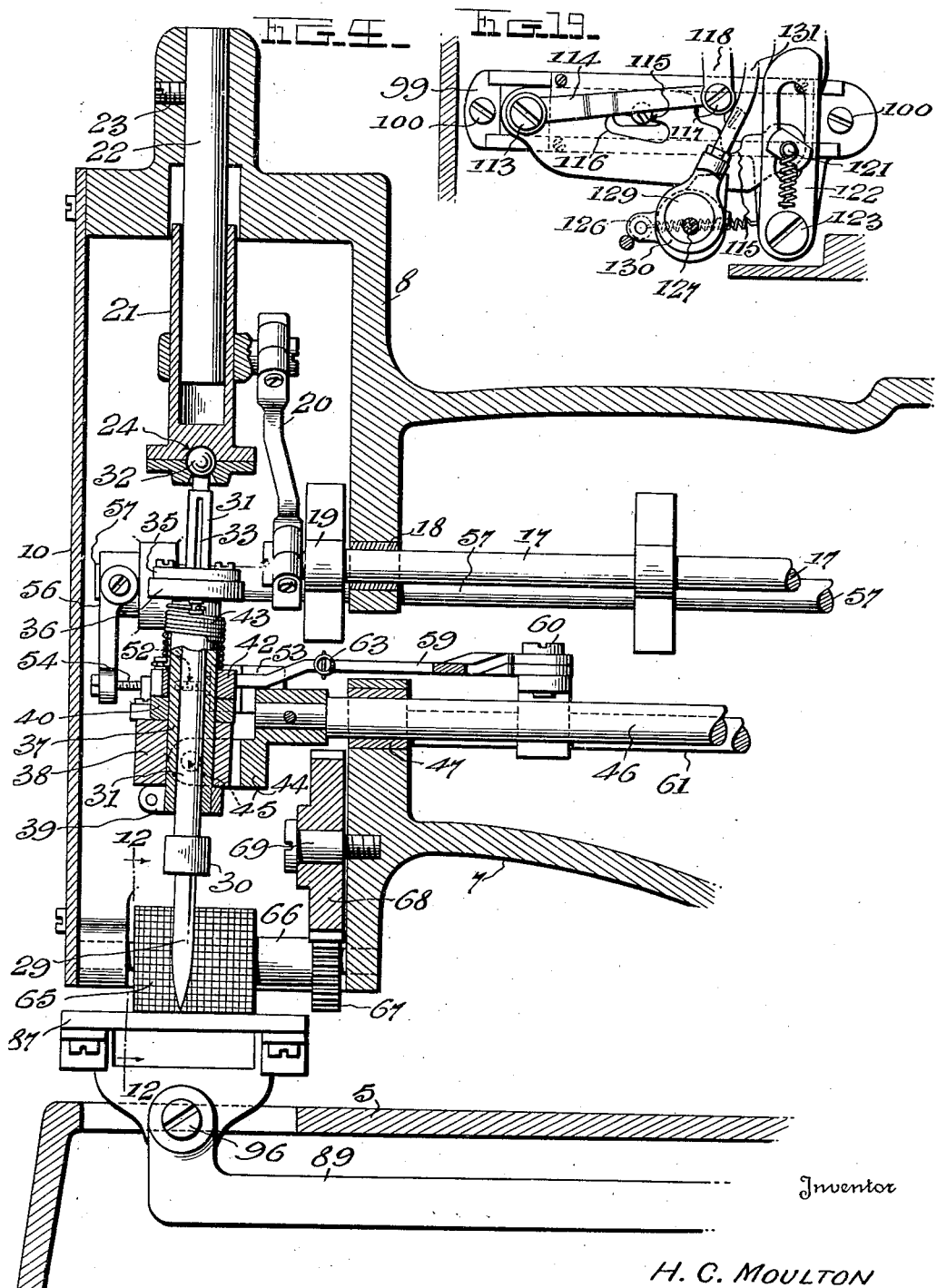

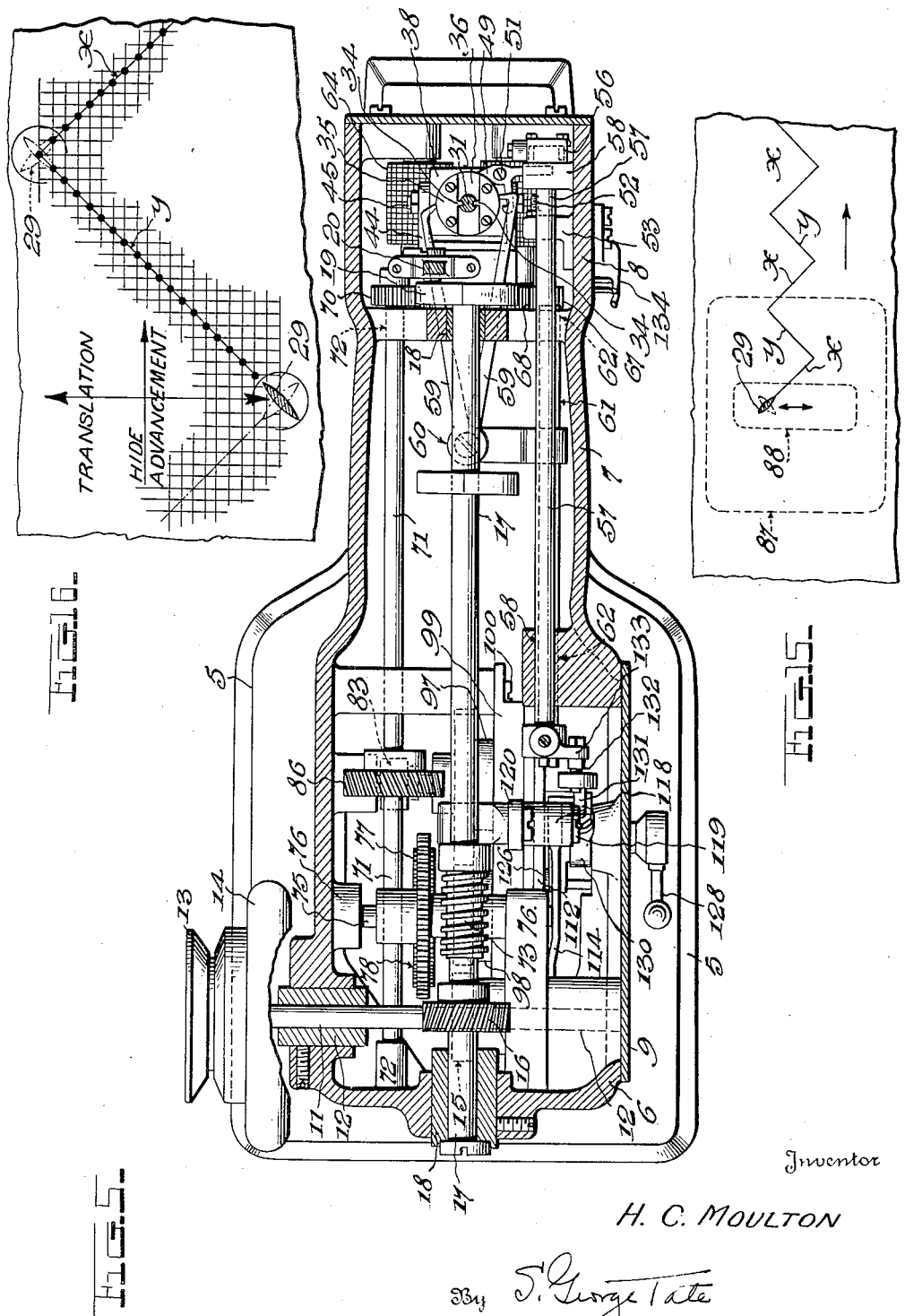

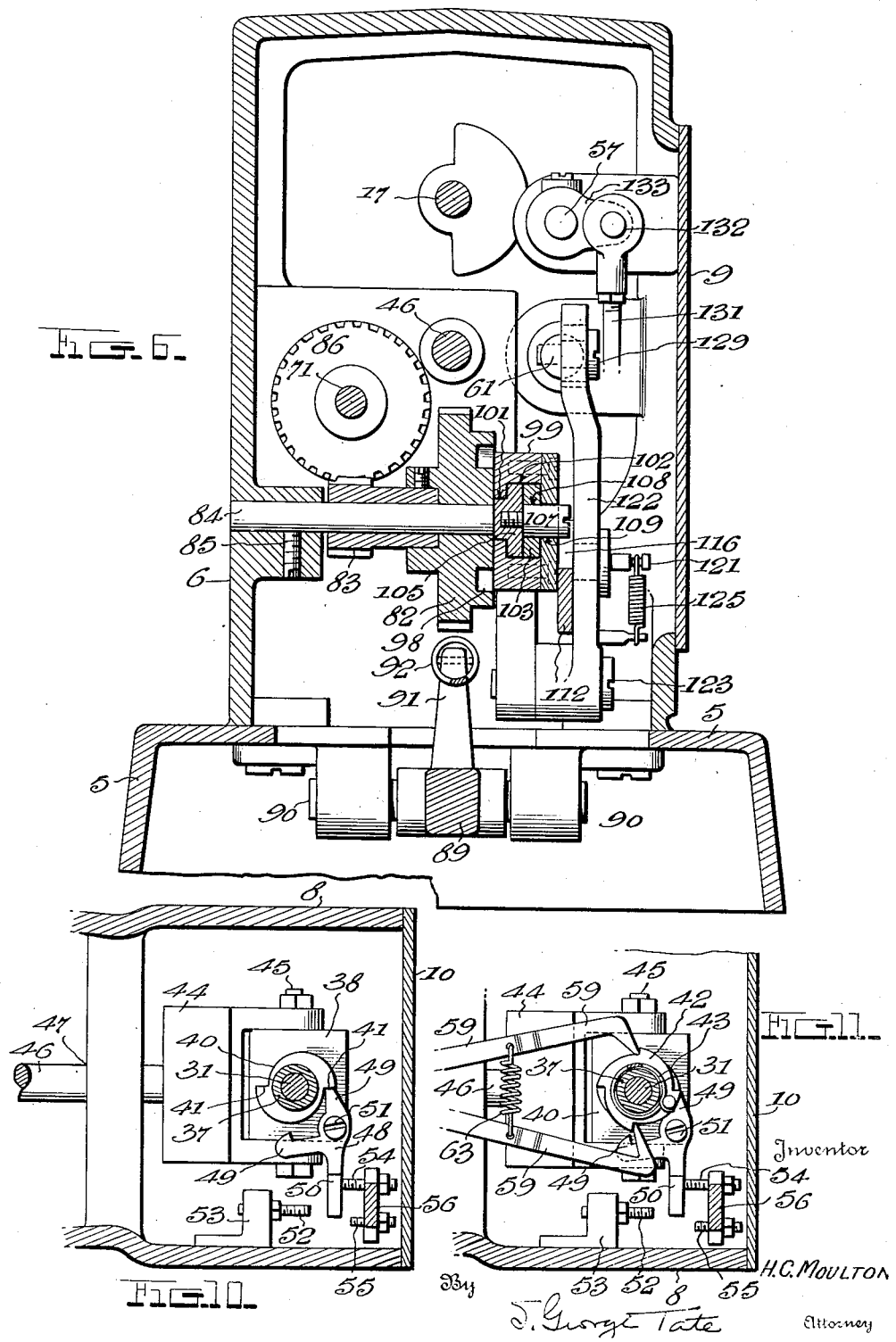

March 9, 1937.  H. C. MOULTON  2,073,219
FUR CUTTING MACHINE
Filed Sept. 13, 1935   9 Sheets-Sheet 7
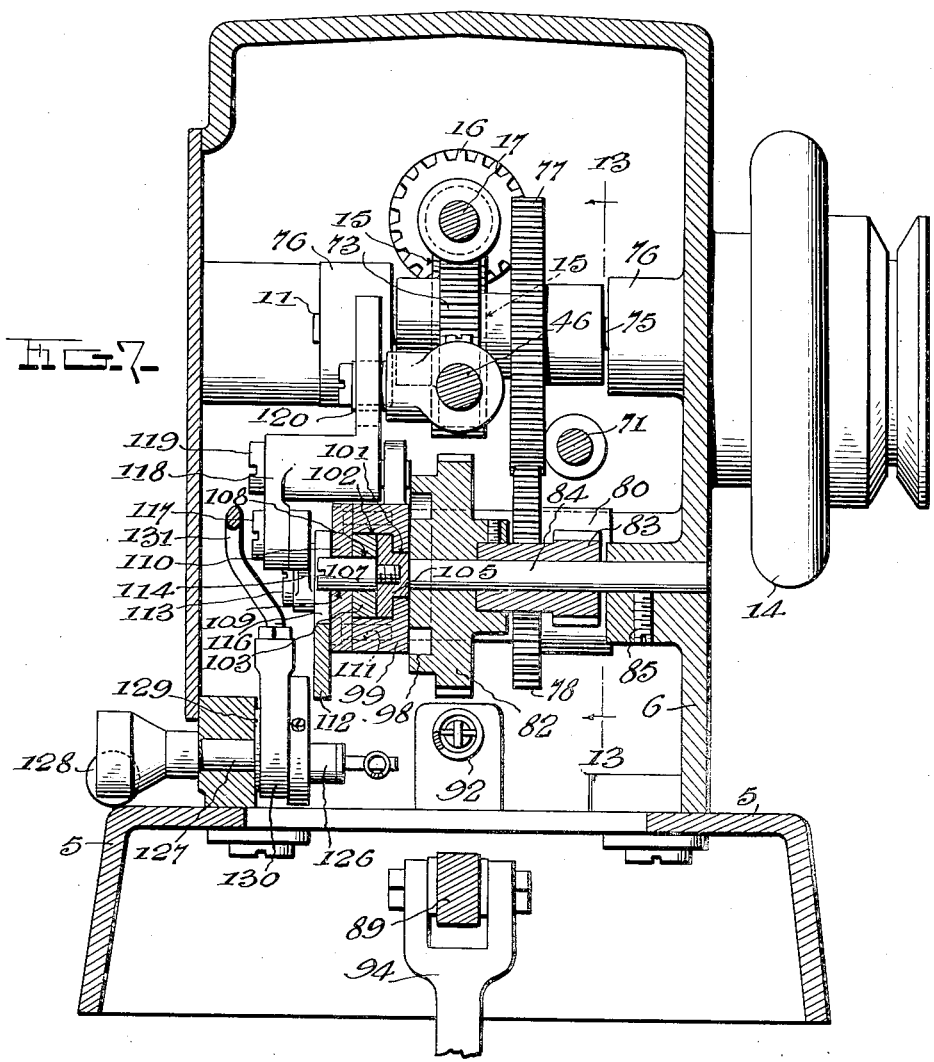
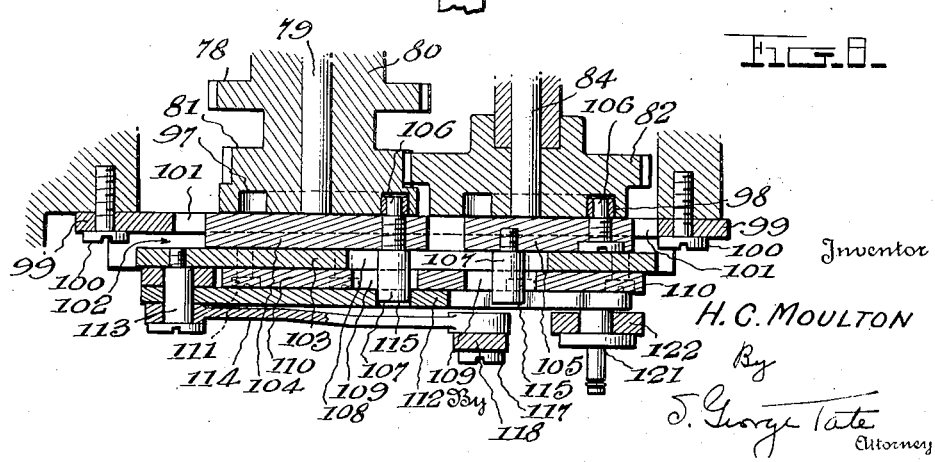
Inventor
H. C. Moulton
By
J. George Tate
Attorney

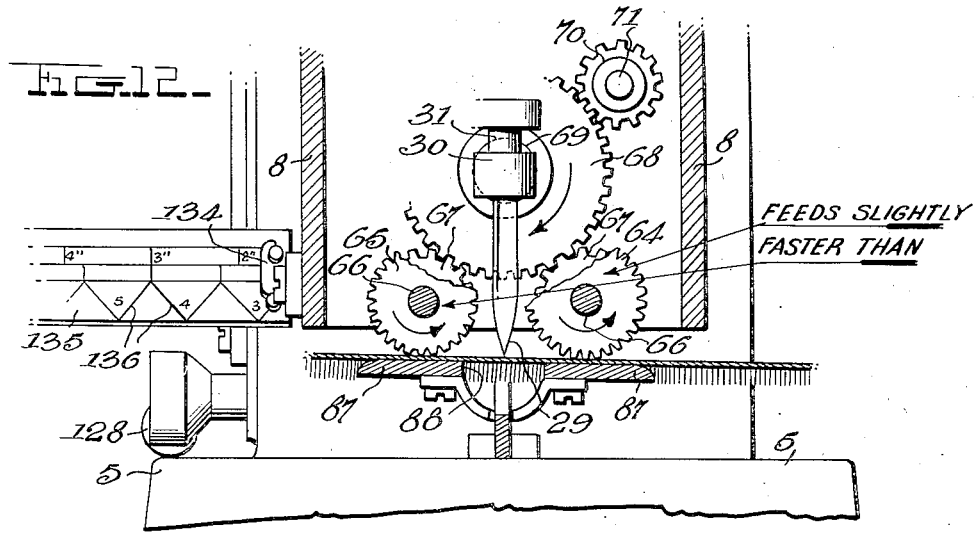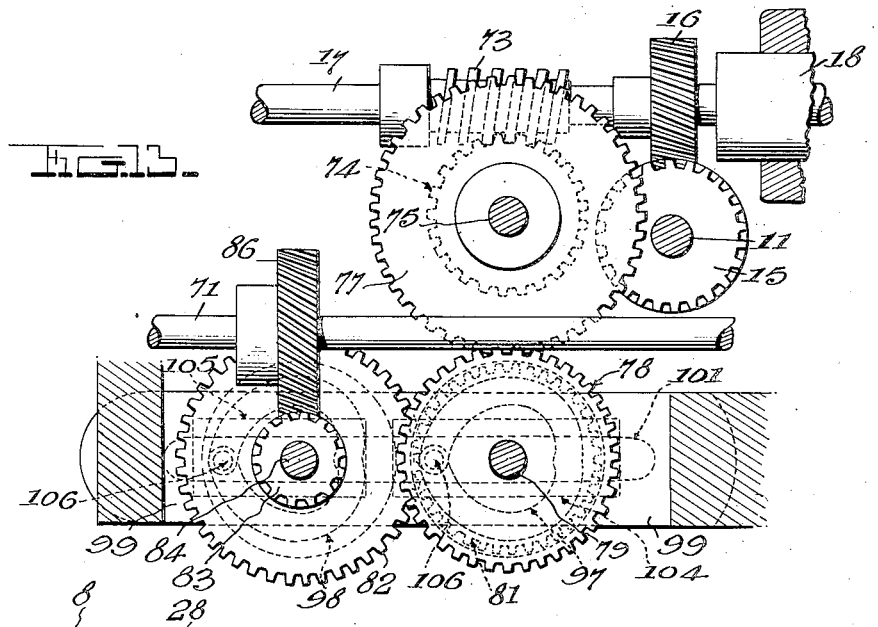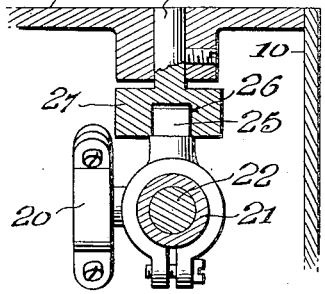

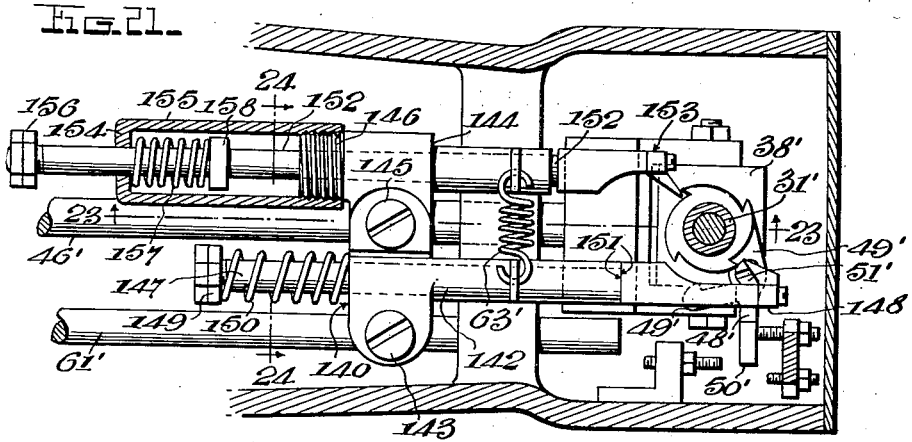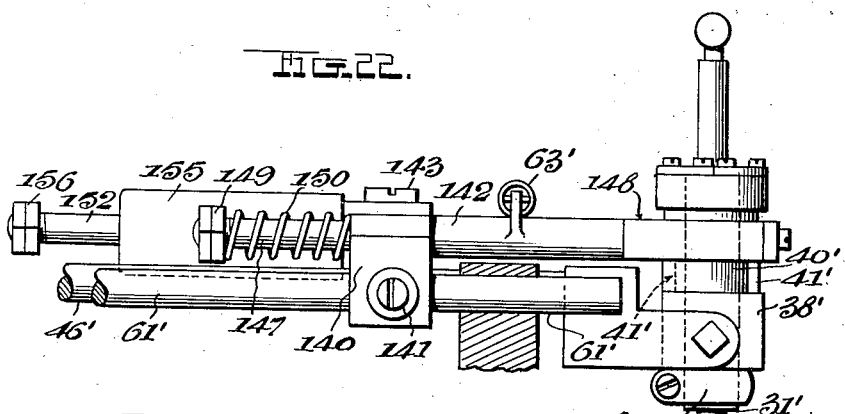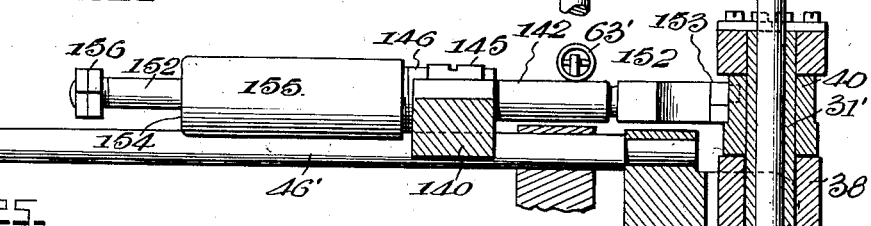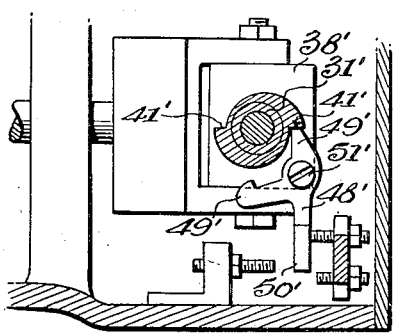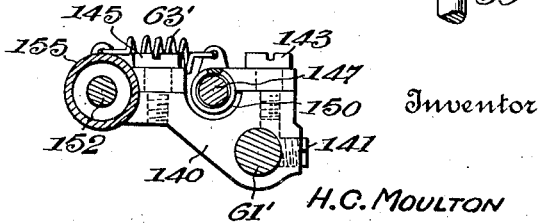

Patented Mar. 9, 1937

2,073,219

UNITED STATES PATENT OFFICE 2,073,219

FUR CUTTING MACHINE

Harley C. Moulton, Maplewood, Mo., assignor to Lewis Invisible Stitch Machine Company, St. Louis, Mo., a corporation of Maine Application September 13, 1935, Serial No. 40,510

52 Claims. (Cl. 164—50)

My present invention relates generally to the art of cutting fur bearing hides, or more particularly to the art of notching the edges of fur bearing hides which are to be sewed together, and primarily has for its object to provide a machine embodying novel mechanisms for performing this function.

It has been discovered in the fur garment industry that the line of stitching between two skins can be fairly well concealed by providing the edges of the skins with interfitting notches and sewing the skins together along the edges of these notches. It has also been found difficult to cut fur bearing hides along any desired line without objectionably severing hairs of the hide during the cutting process. In application Serial No. 3,118, filed January 23, 1935, by Oscar M. Dean on Fur cutting machine, is disclosed a novel fur cutting machine capable of cutting fur bearing hides along a desired line without objectionably severing hairs, the particular line disclosed being the desired notched or zig-zag line. The mechanisms disclosed in the application referred to included a narrow flat, two-edged cutting element, means to feed or advance the hides, means to impart reciprocation to the cutting element and also movement of translation back and forth across the path of hide advancement to effect the notched-line or zig-zag path of cut, and means to assure presentation of the flat of the cutting element always in line with the cut being made.

In its more detailed nature, my present invention seeks to provide a novel fur cutting machine embodying certain new and useful improvements over the mechanisms disclosed in the application above referred to and including the narrow, flat, two-edged cutting element, novel means to reciprocably and swingably support the cutting element, novel means for imparting translatory movement to the cutting element, novel means for varying the degree of translatory movement, novel means for corelating the translatory movement and the hide advancing movement, novel means for controlling the position of the cutting element to aline the flat thereof with the line of cut being made, novel means for corelating the cutting element position controlling means and the translatory movement imparting and varying means, novel means for supporting and advancing the hides whereby the same are stretched taut in the zone of operation of the cutting element, and novel driving connections for effecting operation of the various mechanisms.

With the above and other objects in view which will more fully appear, the nature of the invention will be more clearly understood by following the description, the appended claims, and the several views illustrated in the accompanying drawings.

In the drawings:—

Figure 1 is a left side elevation of my improved fur cutting machine, the removable side frame plate being removed for the purpose of illustrating the mechanism within the frame standard.

Figure 2 is a front elevation of the machine with the front cover plate removed.

Figure 3 is an inverted plan view of the machine.

Figure 4 is a detail vertical longitudinal section taken through the frame head portion of the machine.

Figure 5 is a horizontal section taken on the line 5—5 on Figure 1.

Figure 6 is a vertical cross section taken on the line 6—6 on Figure 1.

Figure 7 is a vertical cross section taken on the line 7—7 on Figure 1.

Figure 8 is a detail horizontal section taken on the line 8—8 on Figure 1.

Figure 9 is a detail vertical cross section taken on the line 9—9 on Figure 1.

Figure 10 is a detail horizontal section taken on the line 10—10 on Figure 2.

Figure 11 is a detail horizontal section taken on the line 11—11 on Figure 2.

Figure 12 is a detail vertical cross section taken on the line 12—12 on Figure 4.

Figure 13 is a detail longitudinal section taken on the line 13—13 on Figure 7.

Figure 14 is a detail horizontal section taken on the line 14—14 on Figure 1.

Figure 15 is a diagrammatic plan view illustrating a section of hide passing over the supporting plate and formation of a continuous zig-zag or notched line cut therein.

Figure 16 is a diagrammatic plan view illustrating the manner in which the hide and the cutting element move relatively to cause the cutting element to form a zig-zag or notched-line cut.

Figures 17 and 18 are plan views illustrating the two scale faces provided on a scale plate mountable upon the machine frame head and adaptable to facilitate the cutting of notches in the hide of varying sizes.

Figures 19 and 20 are detail face views respectively illustrating the lowered and elevated positions of the clutch plate and the relative positions of the crank roller by which the clutch plate is shifted.

Figure 21 is a detail view similar to Figure 11 and illustrates a modified form of energy storing means for effecting movement of the cutting element about its axis.

Figure 22 is a left side elevation of the parts shown in Figure 21.

Figure 23 is a detail vertical cross section taken on the line 23—23 on Figure 21.

Figure 24 is a detail vertical section taken on the line 24—24 on Figure 21.

Figure 25 is a detail view similar to Figure 10.

Like reference numerals designate corresponding parts throughout the figures of the drawings.

In my improved machine I employ a frame comprising a base 5, a standard 6, an overhanging arm 7, and a front head 8. The left side of the standard has an opening to provide access to the mechanism within the standard which is closed by a removable plate 9. The front head 8 is similarly equipped with an opening through which access may be had to the mechanism within the head and this opening is closed by a removable plate 10.

A primary drive shaft 11 is supported transversely in bearings 12 in the frame and projects from the right hand side of the frame where it is equipped with a pulley 13 and a handwheel 14. By thus mounting the shaft 11, the handwheel 14 is positioned at the right hand side of the machine instead of at the rear end thereof and in a position to be conveniently accessible to the operator who is stationed in front of the frame head 8 and for making direct connection with a power transmitting shaft.

Within the frame the shaft 11 carries a worm 15 which meshes with and imparts rotation to a worm 16 mounted on the cutting element reciprocating or main drive shaft 17 which is rotatably supported in frame bearing 18 and extends forwardly into the frame head 8 where it is equipped with a counterweighted crank 19. The crank is pitman connected as at 20 with a reciprocating block or sleeve 21 slidable vertically on a guide post 22 secured as at 23 in the head 8. See Figures 1, 2 and 4. The sleeve 21 is equipped at its lower end with a ball socket 24 and is held against rotation about its axis by a guide extension 25 which projects from the collar by which the pitman 20 is secured to the sleeve and which works up and down in a guide groove 26 provided in the guide member 27 secured at 28 to the head as shown in Figures 2 and 14.

In my improved machine I employ a cutting element 29 which is in the nature of a narrow flat blade having two cutting edges merging in a central piercing or penetrating point. The element is removably secured in any approved form of chuck 30 at the lower end of a cutter bar 31 which is vertically reciprocable with the sleeve 21 and also capable of swinging movement relative to said sleeve by reason of the provision of the ball 32 at the upper end of the bar and connected in the ball socket 24 with which the sleeve is provided.

The cutter bar 31 is spline grooved as at 33 and fingers 34 projecting from members 35 removably secured to the head 36 surrounding the cutter bar serve to permit the bar to move longitudinally in said head while preventing rotation of said bar independent of the head. The head 36 forms a part of a sleeve 37 in which the bar 31 is reciprocably supported. This sleeve 37 is rotatably supported in a block 38 but is held against longitudinal movement in the block by a lower collar 39 secured thereon beneath the block and an upper collar 40 secured thereon above said block and provided with diametrically oppositely disposed stop lugs 41, the purpose of which will become apparent as the description progresses.

A ratchet collar 42 is freely rotatable on the sleeve 37 above the collar 40 and is equipped with four radially disposed teeth as shown in detail in Figures 4 and 11. Between the collar 42 and head 36 a coil spring 43 encircles the sleeve 37, and the ends of the spring are secured to the head 36 and the ratchet collar 42 in such a manner that the said spring tends constantly to rotate the sleeve 37 and the cutter bar 31 about their common axis.

A bifurcated shifter head 44 is connected at 45 to the block 38 and is carried at the end of a shifter rod 46 longitudinally slidable in frame bearings 47. It will be obvious by reference to Figure 4 of the drawings that by longitudinally shifting the rod 46 the cutter bar 31 may be swung back and forth on its ball and socket mounting 32, 24.

A release and stop member 48 which includes a pair of release and stop fingers 49 disposed at right angles to each other and an actuator crank extension 50 is pivotally supported as at 51 upon the block 38 so as to be bodily movable back and forth with the cutter bar 31. The extension 50 projects between a rear adjustable abutment 52 which is secured as at 53 upon the frame head 8 and a front pair of adjustable abutments 54 and 55 each of a different length and supported on a shiftable carrier arm 56 swingably supported on a rock shaft 57 which is rockable in bearings 58 provided therefor in the machine frame. By rocking the shaft 57 about its axis the longitudinal abutment 54 or the shorter abutment 55 may be presented for engagement with the extension 50. See Figures 2 and 10.

A pair of ratchet holding and rotating arms 59 engage opposite sides of the ratchet collar 42 as shown in Figure 11 and these arms are pivoted at 60 and are bodily movable with a longitudinally shiftable rod 61 slidable in bearings 62 provided therefor in the frame. A spring 63 serves to hold the arm 59 in yieldable engagement with the teeth of the ratchet collar.

The cutting element 29 partakes of its reciprocatory and translatory movement between a pair of feed rollers 64 and 65 mounted on shafts 66 suitably journaled in the frame head 8 and each equipped with a pinion 67. A large driving gear 68 engages and imparts rotation to both roller pinions 67 and is supported on a stud shaft 69 secured to the frame head 8. Rotation is imparted to the gear 68 through the medium of a driving pinion 70 carried by the drive shaft 71 rotatable in frame bearings 72. The shaft 17 carries a worm 73 which meshes with a worm 74 on a transverse shaft 75 mounted in frame bearings 76, and the shaft 75 carries a large spur gear 77 which meshes with and drives a large spur gear 78 rotatable about the cam supporting stud shaft 79. The sleeve 80 which carries the gear 78, also carries a smaller gear 81 which meshes with a larger gear 82 secured with the sleeve worm gear 83 to rotate about another stud shaft 84. The stud shafts 79 and 84 are secured at 85 upon the machine frame and the worm 83 meshes with and imparts rotation to the worm 86 carried by the drive shaft 71.

Through the above described driving connections rotation is imparted to the feed rollers 64 and 65. In my improved machine I wish to stretch the hide taut between the feed rollers 64 and 65 so as to facilitate the cutting operation. In this particular disclosure, I have shown a feed roller 64 which is slightly larger in diameter than the feed roller 65 thus making it capable of imparting slightly greater feed travel than is transmitted by the roller 65. Obviously the same effect may be obtained by varying the driving gear ratio and it is to be understood that the invention comprehends the use of any means for imparting to the advance portion of the hide a slightly greater travel speed that is applied to the trailing portion thereby serving to draw the hide taut in the zone of operation of the cutting element.

The feed or hide advancing rollers 64 and 65 are opposed by a hide supporting plate 87 having an opening 88 therein to permit the reciprocatory and translatory movement of which the cutting element 29 partakes. The plate 87 is tiltably supported on a rocker arm 89 pivoted intermediate its ends as at 90 and having a crank extension 91 spring connected as at 92 to an adjusting screw equipment 93 through the medium of which the tension of the spring 92 may be adjusted from without the machine frame. A push rod 94 connects with the end of the arm 89 and through the medium of this rod and a foot treadle (not shown) the arm may be adjusted to move the plate 87 downwardly away from the rollers 64 and 65 to facilitate insertion and removal of the fur bearing hide being cut. The plate 87 has a universal tilt support on the arm 89, being pivoted as at 95 to permit tilting in the transverse or hide advancing direction, and at 96 for tilting movement in the fore and aft or across the feed direction. Because of the relative sizes of the gears 81 and 82 and the manner in which rotation is imparted thereto, it will be obvious that the gear 81 rotates slightly faster than the gear 82. A grooved heart cam 97 is rotatable with the gear 81 and a similar cam 98 is rotatable with the gear 82. The cams 97 and 98 serve, in a manner soon to be described, to impart translatory movement to the cutter bar 31, and the cam 97 rotatable with the shifter gear 81 is capable of imparting the least amount of translatory movement whereas the cam 98 rotatable with the smaller gear 82 is capable of imparting the greatest amount of translatory movement.

A slide guide 99 is secured as at 100 to portions of the machine frame and is provided with a central slide groove 101 which extends through the wall of the guide and into the slide chamber 102 of the guide in which a flat slide member 103 is mounted. A pair of selective slide members 104 and 105 are independently slidable in the chamber 102 and are T-shaped in cross section thereby providing portions extending into the central groove 101. See Figures 7, 8 and 9. Each of the slide members 104, 105 carries a roller-equipped pin portion 106 projecting into the cam groove of one of the cams 97, 98, and a clutch pin portion 107 projecting through a slotway 108 in the flat slide 103 and through slots 109 in the cover plate 110 which is removably secured as at 111 to the guide 99, into position for being engaged by the clutch plate 112.

The clutch plate 112 is pivotally connected as at 113 to the slide 103 and a movement transmitting pitman 114 is connected to the same pivot. The clutch plate has a pair of selective clutching recesses 115 to engage the slide pins 107 and a pair of lost motion clearances 116 adapted to permit free movement of said pins. It will be understood that the rotating cams 97 and 98 will impart independent sliding movement of the selective slide members 104, 105 in the chamber 101, 102 of the guide 99. By moving the plate 112 so as to clutch-engage a selective one of the pins 107 the movement of the slide member from which that particular pin projects will be imparted to the slide 103, plate 112, and pitman 114, the remaining or non-selected pin 107 sliding idly back and forth in the plate clearance associated therewith.

The pitman 114 is connected at 117 to one end of a lever 118 pivoted intermediate its ends as at 119 to the slide guide 99. The upper end of the lever 118 is slot and pin connected as at 120 to the shifter rod 46 which imparts back and forth or translatory movement to the cutter bar 31. Forward movement of the slide 103, plate 112 and pitman 114 will impart rearward movement to the shifter rod and vice versa because of the provision of the pivot 119 intermediate the ends of the lever 118, and the degree of translatory movement will vary according to which of the cams 97 or 98 is clutch-coupled by the plate 112. The cam 97 is capable of effecting a three-quarter inch notch cut whereas the cam 98 effects the cutting of a one inch notch.

At its free end the plate 112 is pin and slot connected as at 121 with an energy storing lever 122 pivoted at its lower end as at 123 to a lug depending from and rigidly supported on the slide guide 99. At its upper end the lever 122 is connected as at 124 to the rod 61 which carries the ratchet collar engaging arms 59. The slot in the lever 122 is curved, the arc of the curvature being struck from the center of the plate pivot 113, and thus the plate may be adjusted up and down with respect to the lever 122 without changing the position of the lever. A spring 125 tends to hold the plate 112 in the lower position illustrated in Figure 1 of the drawings. A crank roller 126 is engageable with the lower edge of the plate 112 and is movable with a rock shaft 127 rockably supported in the machine frame and equipped with a hand lever 128 and an eccentric portion 129. A sleeve 130 encircles the eccentric 129 and is connected with the lower end of an adjuster rod 131 which is connected at its upper end as at 132 with a crank 133 on the rock shaft 57 through the medium of which swinging movements may be imparted to the carrier arm 56 for the purpose of presenting a selected one of the abutment members 54 or 55 for engagement with the arm extension 50. See Figures 1, 2, 5, 6, and 10.

A supporting bracket 134 is secured at the left hand side of the frame head 8 and has provisions for removably supporting a scale strip 135 provided on its opposite faces with scale and notch markings 136 designed to facilitate the cutting of notches of various sizes. This scale is found to be a great aid to operators having had limited experience with machines of this type. It will be noted that the scale notch graduations start at a certain number. This number equals the graduations or zig-zags from the center of the cutting element when said element is in its extreme backward position. On the scale to be associated with the making of one inch notches the number happens to be 3 and by use of this scale the operator can tell just where to start cutting on the hide. By holding the hide against the scale an operator can see about where the good part of the hide will start and may then place the hide in the machine. Working from the head end of the hide the cut is started with the cutting element toward the operator. When the operator next seeks to cut a hide which must match with the previously cut hide, the cut will be started at the rump end and the start is made with the cutting element at the extreme backward position. In this manner it is possible for the operator to know that the good part of the hide that was started at the head end will dovetail or match with the good part of the skin that was started at the rump end.

In operation the rapid rotation of the shaft 97 will be transmitted in the form of rapid vertical or axial reciprocations to the cutter bar 31 by the crank and pitman connections 19, 20, 21. The rapid rotation of the shaft 17 will likewise be transmitted in the form of relatively slow rotation to the shaft 71 and the hide advancing rollers 64 and 65 in constantly timed relation. It will also be obvious that by rotation of one or the other of the cams 97 and 98 one or the other of the slide members 104, 105 will impart its movement to the cutter element translating rod 46 depending upon which of said slide members is clutch-connected through the medium of the plate 112, serving to move the reciprocating cutting element slowly back and forth across the path of the advancing hide.

The result of slowly advancing the hide and slowly translating the cutting element back and forth across the path of advancement of the hide, is the formation of a continuous zig-zag or notched-line cut, each zig $x$ and each zag $y$ of such cut being formed by a rapid succession of individual narrow cuts formed by the cutting element as shown in Figures 15 and 16. In forming this cut the flat of the narrow cutting element always alines with the line of cut so as to assure a smooth edge cut. This is made possible because any given unit or distance of hide advancement is attended by a like unit or distance of translatory movement of the cutting element and consequently the piercing or penetrating point of the flat cutting element 29 will always strike the hide in the desired line of cut, as shown in Figure 15, and at the completion of the succession of cuts forming each zig or zag, and while the cutting element is elevated out of contact with the hide, the element is rotated 90° about its axis so as to aline the flat thereof with the zig or zag next to be cut.

The number of cutting element reciprocations, or in other words the number of successive individual cuts, utilized to form the individual zigs or zags of the continuous line cut may vary but always are relatively narrow so as to enable the narrow element to pass between the hairs, deflecting but not cutting the same.

In diagrammatic Figure 16 the heavy dots serve to indicate the individual points of penetration and the crossed light lines therefore illustrate what might be termed units of movement, of advancing movement with respect to the hide, and of movement of translation with respect to the cutting element. It will be observed that the points of penetration are spaced apart a distance less than the width or major cross sectional area of the cutting element. Thus positioned a continuous line cut is assured. When the piercing or penetrating points are spaced apart a distance less than half the width of the element, as shown in Figure 16, one cutting edge alone of the element will be effective in forming the line cut in a given direction.

Because of the fact that the translatory movement imparting lever 118 is pivoted intermediate its ends and the lever 22 which shifts the energy storing rod 61 is pivoted at its lower end, the respective rods 46 and 61 will move in opposite directions. In other words whenever the energy storing and holding arms 59 are moving forwardly the ratchet collar 42 with which they cooperate will be moving rearwardly and vice versa. It will be understood that the shifting movement of the translation imparting rod 46 is variable in order to effect the cutting of different size notches and it would be undesirable to materially decrease or otherwise vary the effective movement of the tension holding and storing arms 59. In the position of the parts shown in Figure 1 of the drawings the lesser degree of movement will be imparted to the shifter rod 46 and it will be noted that the pin connecting the plate 112 with the lever 122 is in the lower end of the lever and in position to impart the maximum of swinging movement to said lever. When the plate 112 is elevated to clutch in the control cam having the greatest amount of translatory movement imparting throw, the pin connecting the plate with the lever 122 will be elevated to a position where it will impart a lesser degree of swinging movement to the lever 122 and in this manner the increased back and forth movements imparted to the rod 46 and the ratchet collar 42 will be compensated for by a reduction in the movement imparted to the rod 61 and arms 59 thus balancing the operation and assuring against an overwinding of the coil spring 43.

The coil spring 43 always tends to rotate the cutter bar 31 about its axis in a clockwise direction as viewed in Figures 10 and 11. This movement of the cutter bar is prevented by engagement of the collar lugs 41 with the release and stop fingers 49 of the member 48. At the termination of the translatory movement of the cutting element in either direction, however, the arm 50 will engage and be shifted by one of the adjustable abutments 52, 54, or 55 to release the particular lug 41 being engaged and held by a finger 49 to permit the cutter bar to rotate 90° about its axis at which time the remaining finger will stop the rotation and hold the cutter bar adjustment until the termination of the next translatory movement in the opposite direction. The arms 59 constantly engage the ratchet collar 42 for the purpose of holding the tension stored in the spring 43 and relative movement between these arms and the ratchet collar during translatory movement of the cutter bar also serves to rotate the ratchet collar in a manner whereby the tension lost as an incident to each adjustment of the cutter bar about its axis is restored and the spring maintained in full efficiency.

It will be understood that the plate 112 is held down in the short throw cam clutching position by the spring 125 and may be forced upwardly to the long throw cam clutching position by adjustment of the rock shaft 127 about its axis to cause the crank roller 126 to engage under and lift said plate. This shifting of the position of the rock shaft 127 about its axis for controlling the position of the plate 112 likewise automatically controls the position of the rock shaft 57 through the medium of the connections 131, 132 and thereby automatically presents the proper one of the adjustable abutments 54, 55 for engagement with the arm extension 60 depending upon the amount of translatory movement which is to be imparted to the block 38 which carries the shiftable member 48.

In Figures 1 and 8 of the drawings, the cam 97 and its associated slide member 104 are clutch-connected by the plate 112 and effective to impart the lesser amount of translatory movement to the cutter bar 31 and the machine will be effective to cut the smaller size of notches in the hide, say three-quarter inch. When the other cam 98 is similarly clutch-connected the machine will cut larger notches, say one inch. As before stated the speed of advancement of the hide is constant and if both of the cams 97 and 98 were rotated at the same speed each would bring about the amount of translatory movement which it was capable of transmitting during the same degree of advancement of the hide with the result that the angles of the two sizes of the notches cut by the machine would vary. This condition is avoided and the cutting of notches in which the defining edges bear the same angular relation regardless of the size of the notch is assured by driving the cam 98 at a slightly slower speed than the cam 97.

In Figures 21 through 25 of the drawings I have illustrated a modified form of mechanism for shifting the position of the cutting blade upon completion of the cutting of each zig or zag. In this modified disclosure parts corresponding in function with parts previously described are indicated by the same reference character as in the previous description with the addition of a prime exponent.

In Figures 21 through 25, 46' designates the movement of translation imparting or shifter rod, 61' the energy storing and cutter element shifting movement effecting rod, and 63' the spring for yieldably holding the ratchet engaging fingers against the ratchet. The knife bar bearing sleeve 31' is rotatably supported in the block 38' and is held against relative longitudinal movement by lower and upper stop collars 39' and 40'. The collar 40' is equipped with diametrically oppositely disposed stop plugs 41' with which the stop fingers 49' of the release and stop member 48' are engageable for the purpose of controlling the position of the cutting element. The member 48' includes the actuator crank extension 50' and is pivotally supported as at 51' on the block 38'.

All of the parts designated above which include the prime exponent correspond with and operate in the same manner as like parts designated without the prime exponent in the form of mechanism first described herein.

In the modified form of mechanism illustrated in Figs. 21 through 25, 140 designates a bracket member which is secured at 141 to the rod 61'. A sleeve bearing 142 is pivotally supported as at 143 on the bracket member 140, and a sleeve bearing 144 is pivotally supported as at 145 on said bracket member. The bearing member 144 includes an externally threaded extension 146.

A rod 147 is slidably supported in the sleeve bearing 142 and carries, at its front end a laterally-rearwardly projected ratchet engaging finger 148. The rod 147 extends beyond the sleeve bearing 142 and is equipped, at its rear end, with an abutment head 149. A spring 150 interposed between the sleeve bearing member 142 and the abutment head 149 constantly tends to urge the finger 148 rearwardly tending to hold the stop shoulders 151 of the members 142 and 148 in engagement.

A rod 152 is slidably supported in the sleeve bearing 144 and carries, at its forward end, a laterally-forwardly projected ratchet engaging finger 153. At its rear end the rod 152 projects through the threaded extension 146 and through an aperture in the end wall 154 of the stop casing 155 mounted upon said threaded extension. Where it projects beyond the wall 154 the rod 152 is equipped with an abutment head 156 and within the casing 155 said rod is equipped with an abutment head 158. A spring 157 is interposed between the wall 154 and the abutment head 158 and constantly tends to hold the abutment head 156 in engagement with the casing wall 154.

It will be readily seen that in this form of the invention I employ a pair of reciprocable spring plungers which are alternately active to store up energy effective for shifting the position of the cutting element. In this manner all danger of over winding and breaking coil spring equipment such as is employed in the first described form of the invention is avoided. It will be readily understood by reference to Figure 21 of the drawings that as the plunger rods 147, 152 are moved together forwardly the finger 153 carried by the rod 152 will engage a ratchet tooth as shown and be held against forward movement whereas the finger 148 carried by the rod 147 will slide freely over the ratchet teeth. Thus holding the rod 152 against forward movement while the sleeve bearing 144 and casing 155 with which it is associated move forward causes the spring 157 to be compressed thereby storing energy which serves to rotate the ratchet one-quarter turn when the respective stop lug 41' is released in the manner hereinbefore described.

As the rods 147, 152 now start to move together rearwardly the finger 148 will engage a ratchet tooth and be held against rearward movement whereas the finger 153 will slide freely over the ratchet teeth. Thus holding the rod 147 against movement as the associated bearing sleeve 142 moves rearward will bring about a compression of the spring 150 and storing of energy effective to rotate the ratchet one-quarter turn when the respective stop lug 41' is again released as hereinbefore described. The pivotal mountings of the bearing sleeves 142, 144 at 143 and 145 provide for the lateral movement incident to proper cooperation of the fingers 148, 153 with the ratchet teeth, and the spring 63' serves to yieldably hold said fingers engaged with the ratchet teeth. This mounting of the rods also enables complete separation of the fingers 148, 153 from the ratchet teeth whenever desired.

In this modified form of ratchet operating mechanism, should the knife bar catch for any reason, the fingers 148, 153 will simply move forward and backward without causing any damage to the machine, and should any mis-adjustment cause a finger to miss in any operation cycle, proper functioning of the parts will automatically pick up again on the next cycle and cause the machine to operate properly.

It is of course to be understood that the details of structure and arrangement of parts may be variously changed and modified without departing from the spirit and scope of my invention.

I claim:—

1. In a fur cutting machine, a slender flat cutting element having a penetrating point, means for supporting the element, means for reciprocating the element in its support, spring means tending to rotate the element about its axis, and means for at times securing the element against rotation and for at times releasing the element to permit rotation including shiftable devices for varying the respective securing and releasing intervals.

2. In a fur cutting machine, a slender flat cutting element having a penetrating point, means for reciprocably and swingably supporting said element, means to reciprocate the element, means to swing the element back and forth while it is reciprocating, means including a spring tending to rotate the element about its axis, means for securing the element against rotation while swinging, means for varying the degree of swing imparted to said element, and means including a plurality of sets of spaced abutments selectively engageable according to the degree of swinging movement of which the element is partaking at a given time and active to release said securing means and permit the element to rotate about its axis.

3. In a fur cutting machine, a slender flat cutting element having a penetrating point, means for supporting the element, means for reciprocating the element in its support, spring means tending to rotate the element about its axis, means to secure the element against rotation, means to impart translatory movement to the element supporting means back and forth, means active at the end of the translatory movement in each direction for releasing said securing means to permit the element to rotate a predetermined degree, and means always moving oppositely to the direction of translatory movement for storing energy in the spring means.

4. In a fur cutting machine, a slender flat cutting element having a penetrating point, means for supporting the element, means for reciprocating the element in its support, spring means tending to rotate the element about its axis, means to secure the element against rotation, means to impart translatory movement to the element supporting means back and forth, means active at the end of the translatory movement in each direction for releasing said securing means to permit the element to rotate a predetermined degree, means always moving oppositely to the direction of translatory movement for storing energy in the spring means, means to vary the degree of translatory movement, and means for correspondingly varying the degree of movement of the energy storing means.

5. In a fur cutting machine, a slender flat cutting element having a penetrating point, means for supporting the element, means for reciprocating the element in its support, spring means tending to rotate the element about its axis, means to secure the element against rotation, means to impart translatory movement to the element supporting means back and forth, means active at the end of the translatory movement in each direction for releasing said securing means to permit the element to rotate a predetermined degree, means always moving oppositely to the direction of translatory movement for storing energy in the spring means, and means for increasing the degree of translatory movement and for correspondingly diminishing the degree of movement of the energy storing means.

6. In a fur cutting machine, a slender flat cutting element having a penetrating point, means for supporting the element, means for reciprocating the element in its support, spring means tending to rotate the element about its axis, means to secure the element against rotation, means to impart translatory movement to the element supporting means back and forth, means active at the end of the translatory movement in each direction for releasing said securing means to permit the element to rotate a predetermined degree, means always moving oppositely to the direction of translatory movement for storing energy in the spring means, and means for decreasing the degree of translatory movement and for correspondingly increasing the degree of movement of the energy storing means.

7. In a fur cutting machine, a slender flat cutting element having a penetrating point, means for supporting the element, means for reciprocating the element in its support, spring means tending to rotate the element about its axis, means to secure the element against rotation, relatively movable means for imparting translatory movement to the element supporting means back and forth and for storing energy in the spring means, means active at the end of the translatory movement in each direction for releasing said securing means to permit the element to rotate a predetermined degree, and means for controlling the relatively movable means to vary the degree of translatory movement without substantially varying the degree of relative movement.

8. In a fur cutting machine, a bar carrying a slender flat cutting element having a penetrating point, means for supporting the bar for reciprocation along its axis and for rotation about its axis and for translatory movement back and forth, means for reciprocating the bar, means for effecting the translatory movement, a stop sleeve rotatable with the bar and having a stop lug, a coil spring encircling the sleeve and having its ends in engagement with the sleeve and a relatively stationary member whereby to tend to rotate the sleeve and the bar, a release and stop finger releasably engaging the stop lug and having a projecting actuator arm, a pair of selective sets of variably spaced abutments one abutment of a selected set being engageable by said arm at the conclusion of the translatory movement of the bar in one or the other direction for effecting release of said finger to permit the bar to rotate about its axis, means for varying the degree of translatory movement of the bar, and means for presenting a selected set of abutments for engagement by said arm according to the degree of translatory movement being transmitted at the particular time.

9. In a fur cutting machine, a cutting element, means for supporting the element for reciprocation and translatory movement back and forth comprising, a guide post, a sleeve slidable on the post and having a ball socket; means for reciprocating the sleeve, a cutter bar for carrying said element and having a ball end mounted in the socket, a bearing sleeve slidably receiving said bar, and means to move the bearing sleeve back and forth.

10. In a fur cutting machine, a cutting element, means for supporting the element for reciprocation and translatory movement back and forth comprising, a guide post, a sleeve slidable on the post and having a ball socket; means preventing movement of the sleeve about its axis, means for reciprocating the sleeve, a cutter bar for carrying said element and having a ball end mounted in the socket, a bearing sleeve slidably receiving said bar, and means to move the bearing sleeve back and forth.

11. In a fur cutting machine, a cutting element, means for supporting the element for reciprocation and translatory movement back and forth comprising, a guide post, a sleeve slidable on the post and having a ball socket; a guide member having a guide groove; means secured to the sleeve and including an arm extending into and slidable in the groove to prevent movement of the sleeve about its axis, means for reciprocating the sleeve, a cutter bar for carrying said element and having a ball end mounted in the socket, a bearing sleeve slidably receiving said bar, and means to move the bearing sleeve back and forth.

12. In a fur cutting machine, a slender flat cutting element having a penetrating point, means for supporting the element for reciprocation along its axis for rotation about its axis and for translatory movement back and forth, means to reciprocate the element, means for moving the element back and forth while it is reciprocating, means including a spring tending to rotate the element about its axis, means for securing the element against rotation while moving back and forth, means for varying the degree of back and forth movement, and means including a plurality of sets of spaced abutments selectively engageable according to the degree of back and forth movement of which the element is partaking at a given time and active to release said securing means and permit the element to rotate about its axis.

13. In a fur cutting machine, a slender cutting element having a penetrating point, means for reciprocating the element, spring means tending to rotate the element about its axis, means to secure the element against rotation, means to swing the element back and forth, means active at the end of each back or forth movement for releasing said securing means to permit the element to rotate a predetermined degree, and means always moving oppositely to the direction of back or forth movement for storing energy in the spring means.

14. In a fur cutting machine, a slender cutting element having a penetrating point, means for reciprocating the element, spring means tending to rotate the element about its axis, means to secure the element against rotation, means to swing the element back and forth, means active at the end of each back or forth movement for releasing said securing means to permit the element to rotate a predetermined degree, means always moving oppositely to the direction of back or forth movement for storing energy in the spring means, means to vary the degree of back and forth movement, and means for correspondingly varying the degree of movement of the energy storing means.

15. In a fur cutting machine, a narrow flat cutting element having a piercing point, means to reciprocate the element, means to translate the reciprocating element back and forth, spring means tending to rotate the element about its axis, stop and release means movable back and forth with the element serving to secure the element against rotation during back and forth movement and for permitting a limited amount of rotation thereof at the completion of each back or forth movement and including an actuator arm extension, an abutment member, a pair of abutment members of different lengths and selectively presentable in cooperative spaced relation to the first mentioned abutment, said extension being engageable with the first mentioned abutment member or a selected one of the pair of abutment members at the end of each back or forth movement, means to vary the degree of back and forth movement, and means for shifting the pair of abutment members to present a selected one thereof for engagement with the extension according to the degree of back and forth movement being imparted at the time.

16. In a fur cutting machine, a narrow flat cutting element having a piercing point, means to reciprocate the element, means to translate the reciprocating element back and forth, spring means tending to rotate the element about its axis, stop and release means movable back and forth with the element serving to secure the element against rotation during back and forth movement and for permitting a limited amount of rotation thereof at the completion of each back or forth movement and including an actuator arm extension, an abutment member, a pair of abutment members of different lengths and selectively presentable in cooperative spaced relation to the first mentioned abutment, said extension being engageable with the first mentioned abutment member or a selected one of the pair of abutment members at the end of each back or forth movement, means to vary the degree of back and forth movement, and means for shifting the pair of abutment members to present a selected one thereof for engagement with the extension according to the degree of back and forth movement being imparted at the time, each said abutment member being adjustable to enable alteration of the position thereof in space.

17. In a fur cutting machine, a bar carrying a slender flat cutting element having a penetrating point, means for supporting the bar for reciprocation along its axis and for rotation about its axis and for translatory movement back and forth, means for reciprocating the bar, means for effecting the translatory movement, a stop sleeve rotatable with the bar and having a stop lug, a ratchet collar rotatable on the sleeve, a coil spring encircling the sleeve and having its ends in engagement with the sleeve and the ratchet collar whereby to tend to rotate the sleeve and the bar, a release and stop finger releasably engaging the stop lug, means operable during translatory movement of the bar for releasing said finger to permit the bar to rotate about its axis, and means engaging the ratchet collar and movable in a direction always opposite the direction of translatory movement for rotating the ratchet collar and retaining tension in the spring.

18. In a fur cutting machine, a slender flat cutting element having a penetrating point, means for supporting the element, means for reciprocating the element in its support, spring means tending to rotate the element about its axis, and means for at times securing the element against rotation and for at times releasing the element to permit rotation including shiftable devices for varying the respective securing and releasing intervals, said devices also being adjustable to enable changing the timing of the respective securing and releasing intervals.

19. In a fur cutting machine, a bar carrying a slender flat cutting element having a penetrating point, means for supporting the bar for reciprocation along its axis and for rotation about its axis and for translatory movement back and forth, means for reciprocating the bar, means for effecting the translatory movement, a stop sleeve rotatable with the bar and having a stop lug, a coil spring encircling the sleeve and having its ends in engagement with the sleeve and a relatively stationary member whereby to tend to rotate the sleeve and the bar, a release and stop finger releasably engaging the stop lug and having a projecting actuator arm, a pair of selective sets of variably spaced abutments one abutment of a selected set being engageable by said arm at the conclusion of the translatory movement of the bar in one or the other direction for effecting release of said finger to permit the bar to rotate about its axis, means for varying the degree of translatory movement of the bar, and means for presenting a selected set of abutments for engagement by said arm according to the degree of translatory movement being transmitted at the particular time, at least one abutment of each set being adjustable to enable accurate timing of the finger release.

20. In a fur cutting machine, a bar carrying a slender flat cutting element having a penetrating point, means for supporting the bar for reciprocation along its axis and for rotation about its axis and for translatory movement back and forth, means for reciprocating the bar, means for effecting the translatory movement, a stop sleeve rotatable with the bar and having a stop lug, a ratchet collar rotatable on the sleeve, a coil spring encircling the sleeve and having its ends in engagement with the sleeve and the ratchet collar whereby to tend to rotate the sleeve and the bar, a release and stop finger releasably engaging the stop lug, means operable during translatory movement of the bar for releasing said finger to permit the bar to rotate about its axis, and a shiftable member and a pair of oppositely directed actuating members engageable with opposite sides of the ratchet collar and movable with the shiftable member to impart rotation to the ratchet collar and retain tension in the spring.

21. In a fur cutting machine, a bar carrying a slender flat cutting element having a penetrating point, means for supporting the bar for reciprocation along its axis and for rotation about its axis and for translatory movement back and forth, means for reciprocating the bar, means for effecting the translatory movement, a stop sleeve rotatable with the bar and having a stop lug, a ratchet collar rotatable on the sleeve, a coil spring encircling the sleeve and having its ends in engagement with the sleeve and the ratchet collar whereby to tend to rotate the sleeve and the bar, a release and stop finger releasably engaging the stop lug, means operable during translatory movement of the bar for releasing said finger to permit the bar to rotate about its axis, a shiftable member and a pair of oppositely directed actuating members engageable with opposite sides of the ratchet collar and movable with the shiftable member to impart rotation to the ratchet collar and retain tension in the spring, and means to cause the shiftable member always to move oppositely to the direction of translatory movement.

22. In a fur cutting machine, a bar carrying a slender flat cutting element having a penetrating point, means for supporting the bar for reciprocation along its axis and for rotation about its axis and for translatory movement back and forth, means for reciprocating the bar, means for effecting the translatory movement, a stop sleeve rotatable with the bar and having a stop lug, a ratchet collar rotatable on the sleeve, a coil spring encircling the sleeve and having its ends in engagement with the sleeve and the ratchet collar whereby to tend to rotate the sleeve and the bar, a release and stop finger releasably engaging the stop lug, means operable during translatory movement of the bar for releasing said finger to permit the bar to rotate about its axis, a shiftable member and a pair of oppositely directed actuating members engageable with opposite sides of the ratchet collar and movable with the shiftable member to impart rotation to the ratchet collar and retain tension in the spring, means to cause the shiftable member always to move oppositely to the direction of translatory movement, means to increase or diminish the degree of translatory movement, and means to correspondingly diminish or increase the degree of movement of said shiftable member.

23. In a fur cutting machine, the combination of a reciprocating narrow flat cutting element, means to feed the hide past the element, means to translate the element back and forth across the path of feed of the hide, means including spring devices for controlling the position of the element to always present the flat thereof in line with the line of cut, longitudinally reciprocable means movable for storing and retaining energy in the spring devices, and means for simultaneously varying the degree of back and forth movement of the element and the degree of reciprocation of the energy storing and retaining means.

24. In a fur cutting machine, the combination of a reciprocating narrow flat cutting element, means to feed the hide past the element, means to translate the element back and forth across the path of feed of the hide, means including spring devices and selective sets of control abutments each set spaced for association with a particular degree of back and forth movement of the element for controlling the position of the element to always present the flat thereof in line with the line of cut, longitudinally reciprocable means movable for storing and retaining energy in the spring devices, and means for simultaneously varying the degree of back and forth movement of the element, the degree of reciprocation of the energy storing and retaining means, and for selecting the proper set of abutments.

25. In a fur cutting machine, the combination of a reciprocating narrow flat cutting element, means to feed the hide past the element, means to translate the element back and forth across the path of feed of the hide, means including spring devices for controlling the position of the element to always present the flat thereof in line with the line of cut, longitudinally reciprocable means movable always in a direction opposite the direction of back or forth movement of the element for storing and retaining energy in the spring devices, and means for simultaneously varying the degree of back and forth movement of the element and the degree of reciprocation of the energy storing and retaining means.

26. In a fur cutting machine, the combination of a reciprocating narrow flat cutting element, means to feed the hide past the element, means longitudinally shiftable to translate the element back and forth across the path of feed of the hide, means including spring devices for controlling the position of the element to always present the flat thereof in line with the line of cut, longitudinally reciprocable means movable for storing and retaining energy in the spring devices, a pair of selective cams one capable of imparting a greater degree of movement than the other, and means for selectively connecting one of the cams with both said longitudinally shiftable means.

27. In a fur cutting machine, the combination of a reciprocating narrow flat cutting element, means to feed the hide past the element, means longitudinally shiftable to translate the element back and forth across the path of feed of the hide, means including spring devices for controlling the position of the element to always present the flat thereof in line with the line of cut, longitudinally reciprocable means movable for storing and retaining energy in the spring devices, a pair of selective cams one capable of imparting a greater degree of movement than the other, and means for selectively connecting one of the cams with both said longitudinally shiftable means including devices for causing the longitudinally shiftable means always to move in opposite directions.

28. In a fur cutting machine, the combination of a reciprocating narrow flat cutting element, means to feed the hide past the element, means longitudinally shiftable to translate the element back and forth across the path of feed of the hide, means including spring devices for controlling the position of the element to always present the flat thereof in line with the line of cut, longitudinally reciprocable means movable for storing and retaining energy in the spring devices, a pair of selective cams one capable of imparting a greater degree of movement than the other, and means for selectively connecting one of the cams with both said longitudinally shiftable means including a lever pivoted intermediate its ends and connected with one longitudinally shiftable means and a lever pivoted at its end and connected with the other longitudinally shiftable means thereby causing the longitudinally shiftable means always to move in opposite directions.

29. In a fur cutting machine, the combination of a reciprocating narrow flat cutting element, means to feed the hide past the element, means longitudinally shiftable to translate the element back and forth across the path of feed of the hide, means including spring devices for controlling the position of the element to always present the flat thereof in line with the line of cut, longitudinally reciprocable means movable for storing and retaining energy in the spring devices, a pair of selective cams one capable of imparting a greater degree of movement than the other, a pivoted lever connected with the first mentioned longitudinally shiftable means, a second pivoted lever connected with the other longitudinally shiftable means, and means for selectively connecting one of the cams with both levers.

30. In a fur cutting machine, the combination of a reciprocating narrow flat cutting element, means to feed the hide past the element, means longitudinally shiftable to translate the element back and forth across the path of feed of the hide, means including spring devices for controlling the position of the element to always present the flat thereof in line with the line of cut, longitudinally reciprocable means movable for storing and retaining energy in the spring devices, a pair of selective cams one capable of imparting a greater degree of movement than the other, a pivoted lever connected with the first mentioned longitudinally shiftable means, a second pivoted lever connected with the other longitudinally shiftable means, and means for selectively connecting one of the cams with both levers including a shiftable clutch plate having slot and pin connection with one of the levers whereby shifting of the plate will vary the effective leverage of the slot and pin connected lever.

31. In a fur cutting machine, the combination of a reciprocating narrow flat cutting element, means to feed the hide past the element, means longitudinally shiftable to translate the element back and forth across the path of feed of the hide, means including spring devices for controlling the position of the element to always present the flat thereof in line with the line of cut, longitudinally reciprocable means movable for storing and retaining energy in the spring devices, a pair of selective cams one capable of imparting a greater degree of movement than the other, a pivoted lever connected with the first mentioned longitudinally shiftable means, a second pivoted lever connected with the other longitudinally shiftable means, and means for selectively connecting one of the cams with both levers including a shiftable clutch plate having slot and pin connection with said second lever whereby shifting of the plate will vary the effective leverage of said second lever.

32. In a fur cutting machine, the combination of a reciprocating narrow flat cutting element, means to feed the hide past the element, means longitudinally shiftable to translate the element back and forth across the path of feed of the hide, means including spring devices for controlling the position of the element to always present the flat thereof in line with the line of cut, longitudinally reciprocable means movable for storing and retaining energy in the spring devices, a pair of selective cams one capable of imparting a greater degree of movement than the other, a pivoted lever connected with the first mentioned longitudinally shiftable means, a second pivoted lever connected with the other longitudinally shiftable means and means for selectively connecting one of the cams with both levers including a shiftable clutch plate having slot and pin connection with said second lever whereby shifting of the plate to render effective the cam capable of imparting the greatest degree of movement will reduce the effective leverage of said second lever.

33. In a fur cutting machine, the combination of a reciprocating narrow flat cutting element, means to feed the hide past the element, means longitudinally shiftable to translate the element back and forth across the path of feed of the hide, means including spring devices for controlling the position of the element to always present the flat thereof in line with the line of cut, longitudinally reciprocable means movable for storing and retaining energy in the spring devices, a pair of selective cams one capable of imparting a greater degree of movement than the other, a pivoted lever connected with the first mentioned longitudinally shiftable means, a second pivoted lever connected with the other longitudinally shiftable means, and means for selectively connecting one of the cams with both levers including a shiftable clutch plate having slot and pin connection with said second lever whereby shifting of the plate to render effective the cam capable of imparting the greatest degree of movement will reduce the effective leverage of said second lever and movement of said plate to render effective the cam capable of imparting the lesser degree of movement will increase the effective leverage of said second lever.

34. In a fur cutting machine, the combination of a reciprocating narrow flat cutting element, means to feed the hide past the element, means longitudinally shiftable to translate the element back and forth across the path of feed of the hide, means including spring devices for controlling the position of the element to always present the flat thereof in line with the line of cut, longitudinally reciprocable means movable for storing and retaining energy in the spring devices, a pair of selective cams one capable of imparting a greater degree of movement than the other, a pivoted lever connected with the first mentioned longitudinally shiftable means, a second pivoted lever connected with the other longitudinally shiftable means, and means for selectively connecting one of the cams with both levers including a shiftable clutch plate having slot and pin connection with said second lever whereby shifting of the plate to render effective the cam capable of imparting the greatest degree of movement will reduce the effective leverage of said second lever and movement of said plate to render effective the cam capable of imparting the lesser degree of movement will increase the effective leverage of said second lever, said first mentioned lever being pivoted intermediate its ends and said second lever being pivoted at one end thereby causing the longitudinal shiftable means always to move in opposite directions.

35. In a fur cutting machine, the combination of a reciprocating narrow flat cutting element, means to feed the hide past the element, means longitudinally shiftable to translate the element back and forth across the path of feed of the hide, means including spring devices for controlling the position of the element to always present the flat thereof in line with the line of cut, longitudinally reciprocable means movable for storing and retaining energy in the spring devices, a pair of selective cams one capable of imparting a greater degree of movement than the other, a pivoted lever connected with the first mentioned longitudinally shiftable means, a second pivoted lever connected with the other longitudinally shiftable means, and means for selectively connecting one of the cams with both levers including a pivoted clutch plate having arcuate slot and pin connection with one of the levers the arc of which slot is struck from the center of the plate pivot whereby shifting of the plate will vary the effective leverage of the pin and slot connected lever without changing its position in space.

36. In a fur cutting machine wherein is provided a cutting element reciprocable and translatable back and forth, means for translating the element including a pair of selective cams one capable of imparting a greater amount of movement than the other, a guide, a plate longitudinally slidable in the guide, a pair of slides slidable in the guide and each having a projecting clutch pin and connection with one of the cams to be slid back and forth thereby, a clutch plate pivoted to the slide plate and having two sets of clutching and lost motion clearance recesses therein selectively presentable for cooperation with the clutch pins for effecting driving connection with one thereof while permitting the other to idle, and means to transmit the movement of the slide plate to the element to translate it back and forth.

37. In a fur cutting machine wherein is provided a cutting element reciprocable and translatable back and forth, means for translating the element including a pair of selective cams one capable of imparting a greater amount of movement than the other, a guide, a plate longitudinally slidable in the guide, a pair of slides slidable in the guide and each having a projecting clutch pin and connection with one of the cams to be slid back and forth thereby, a clutch plate pivoted to the slide plate and having two sets of clutching and lost motion clearance recesses therein selectively presentable for cooperation with the clutch pins for effecting driving connection with one thereof while permitting the other to idle, and means including a thrust rod and a lever pivoted intermediate its ends to transmit the movement of the slide plate to the element to translate it back and forth.

38. In a fur cutting machine wherein is provided a cutting element reciprocable and translatable back and forth, and element position shifting means including shiftable abutments shiftable to accord with variations in the back and forth movement of the element; means for translating the element including a pair of selective cams one capable of imparting a greater amount of movement than the other, a guide, a plate longitudinally slidable in the guide, a pair of slides slidable in the guide and each having a projecting clutch pin and connection with one of the cams to be slid back and forth thereby, a clutch plate pivoted to the slide plate and having two sets of clutching and lost motion clearance recesses therein selectively presentable for cooperation with the clutch pins for effecting driving connection with one thereof while permitting the other to idle, means to transmit the movement of the slide plate to the element to translate it back and forth, and means for simultaneously shifting the clutch plate and the abutments.

39. In a fur cutting machine wherein is provided a cutting element reciprocable and translatable back and forth, and element position shifting means including spring devices; means for translating the element including a pair of selective cams one capable of imparting a greater amount of movement than the other, a guide, a plate longitudinally slidable in the guide, a pair of slides slidable in the guide and each having a projecting clutch pin and connection with one of the cams to be slid back and forth thereby, a clutch plate pivoted to the slide plate and having two sets of clutching and lost motion clearance recesses therein selectively presentable for cooperation with the clutch pins for effecting driving connection with one thereof while permitting the other to idle, means including a thrust rod and a lever pivoted intermediate its ends to transmit the movement of the slide plate to the element to translate it back and forth, and means for storing and holding energy in the spring devices including a thrust rod and a lever connected at one end with the thrust rod and pivotally supported at its other end and slot and pin connected with the clutch plate.

40. In a fur cutting machine wherein is provided a cutting element reciprocable and translatable back and forth, and element position shifting means including spring devices; means for translating the element including a pair of selective cams one capable of imparting a greater amount of movement than the other, a guide, a plate longitudinally slidable in the guide, a pair of slides slidable in the guide and each having a projecting clutch pin and connection with one of the cams to be slid back and forth thereby, a clutch plate pivoted to the slide plate and having two sets of clutching and lost motion clearance recesses therein selectively presentable for cooperation with the clutch pins for effecting driving connection with one thereof while permitting the other to idle, means including a thrust rod and a lever pivoted intermediate its ends to transmit the movement of the slide plate to the element to translate it back and forth, and means for storing and holding energy in the spring devices including a thrust rod and a lever connected at one end with the thrust rod and pivotally supported at its other end and slot and pin connected intermediate its ends with the clutch plate, the slot being struck on an arc centered on the pivot of the clutch plate.

41. In a fur cutting machine wherein is provided a cutting element reciprocable and translatable back and forth, means for translating the element including a pair of selective cams one capable of imparting a greater amount of movement than the other, a guide, a plate longitudinally slidable in the guide, a pair of slides slidable in the guide and each having a projecting clutch pin and connection with one of the cams to be slid back and forth thereby, a clutch plate pivoted to the slide plate and having two sets of clutching and lost motion clearance recesses therein selectively presentable for cooperation with the clutch pins for effecting driving connection with one thereof while permitting the other to idle, means to transmit the movement of the slide plate to the element to translate it back and forth, means normally holding the clutch plate in clutching engagement with one of the projecting pins, and means for forcing the clutch plate into engagement with the remaining pin.

42. In a fur cutting machine wherein is provided a cutting element reciprocable and translatable back and forth, and element position shifting means including spring devices; means for translating the element back and forth including a pair of selective grooved cams one capable of imparting a greater amount of movement than the other, a guide, a plate longitudinally slidable in the guide, a pair of slides slidable in the guide and each having a driving pin projecting into the groove of one of the cams and a projecting clutch pin, a clutch plate pivoted to the slide plate and having a clutching recess for receiving each clutch pin and idling recesses so associated with the clutching recesses that whenever one clutch pin is engaged in one clutching recess the other clutch pin will be in an idling recess, means for imparting the movement of the slide plate to the element to translate it back and forth; means for imparting the movement of the slide plate to the element position shifting means; means for normally holding the clutch plate in clutching engagement with one clutch pin, and means for moving the clutch plate into clutching engagement with the other clutch pin.

43. In a fur cutting machine wherein is provided a cutting element reciprocable and translatable back and forth, and element position shifting means including spring devices; means for translating the element back and forth including a pair of selective grooved cams one capable of imparting a greater amount of movement than the other, a guide, a plate longitudinally slidable in the guide, a pair of slides slidable in the guide and each having a driving pin projecting into the groove of one of the cams and a projecting clutch pin, a clutch plate pivoted to the slide plate and having a clutching recess for receiving each clutch pin and idling recesses so associated with the clutching recesses that whenever one clutch pin is engaged in one clutching recess the other clutch pin will be in an idling recess, means including a lever pivoted intermediate its ends and having driving connection with the slide plate for imparting the movement of the slide plate to the element to translate it back and forth; means including a lever pivoted at one end and having slot and pin connection with the clutch plate for imparting the movement of the slide plate to the element position shifting means; means for normally holding the clutch plate in clutching engagement with one clutch pin, and means for moving the clutch plate into clutching engagement with the other clutch pin.

44. In a fur cutting machine, a slender flat cutting element having a penetrating point, means for supporting the element, means for reciprocating the element in its support, spring means tending to rotate the element about its axis, and means for at times securing the element against rotation and for at times releasing the element to permit rotation including shiftable devices for varying the respective securing and releasing intervals, said spring means including a pair of reciprocable spring plungers, alternately active to store spring energy.

45. In a fur cutting machine, a slender flat cutting element having a penetrating point, means for supporting the element, means for reciprocating the element in its support, means including a pair of spring plungers alternately effective to store and apply spring energy for rotating the element about its axis, means to secure the element against rotation, and means for at times releasing said securing means to permit the element to rotate a predetermined degree.

46. In a machine for cutting fur bearing hide; the combination of a narrow flat reciprocating cutting element having a penetrating point and a cutting edge; means to bring about the relative movement between the element and the hide to cause the element to repeatedly penetrate the hide along each zig and zag comprising a zig-zag line and including devices to turn the element about its axis at the completion of each zig or zag to properly aline the flat thereof with the zig or zag next to be cut; said devices comprising means effective during the cutting of each zig or zag to hold the element against turning and effective upon completion of each zig or zag to release the element to permit it to turn, a ratchet mounted to turn with the element, and a pair of spring plungers engageable with the ratchet and alternately effective to store spring energy during the holding effort of said holding means and to apply said energy to turn said element upon release of said holding means.

47. In a machine for cutting fur the combination of a reciprocable flat cutting element having a penetrating point and a cutting edge, means to translate the element back and forth between fixed limits, means to secure the element against movement about its axis during back and forth movement and for releasing said element to permit a predetermined degree of such movement upon completion of each back or forth movement, a ratchet member mounted to move with the element, and a pair of spring plungers engageable with the ratchet and alternately effective to store energy during movement of translation of the element and for applying energy to turn the element about its axis upon release of said securing means.

48. In a machine for cutting fur the combination of a reciprocable flat cutting element having a penetrating point and a cutting edge, means to translate the element back and forth between fixed limits, means to secure the element against movement about its axis during back and forth movement and for releasing said element to permit a predetermined degree of such movement upon completion of each back or forth movement, a ratchet member mounted to move with the element, a pair of spring plungers engageable at opposite sides with the ratchet and alternately effective to store energy during movement of translation of the element and for applying energy to turn the element about its axis upon release of said securing means, means to pivotally support said plungers, and means to yieldably hold said plungers in engagement at opposite sides with said ratchet.

49. In a machine for cutting fur the combination of a reciprocable flat cutting element having a penetrating point and a cutting edge, means to translate the element back and forth between fixed limits, means to secure the element against movement about its axis during back and forth movement and for releasing said element to permit a predetermined degree of such movement upon completion of each back or forth movement, a ratchet member mounted to move with the element, a pair of spring plungers engageable at opposite sides with the ratchet and alternately effective to store energy during movement of translation of the element and for applying energy to turn the element about its axis upon release of said securing means, a support for said plungers, and means to impart translatory movement to said plunger support in opposition to the translatory movement of said element.

50. In a machine for cutting fur the combination of a reciprocable flat cutting element having a penetrating point and a cutting edge, means to translate the element back and forth between fixed limits, means to secure the element against movement about its axis during back and forth movement and for releasing said element to permit a predetermined degree of such movement upon completion of each back or forth movement, a ratchet member mounted to move with the element, a pair of spring plungers engageable at opposite sides with the ratchet and alternately effective to store energy during movement of translation of the element and for applying energy to turn the element about its axis upon release of said securing means, a support for said plungers, means to impart translatory movement to said plunger support in opposition to the translatory movement of said element, and means to simultaneously vary the degree of movement of translation of said element and said plunger support.

51. In a machine for cutting fur the combination of a reciprocable flat cutting element having a penetrating point and a cutting edge, means to translate the element back and forth between fixed limits, means to secure the element against movement about its axis during back and forth movement and for releasing said element to permit a predetermined degree of such movement upon completion of each back or forth movement, a ratchet member mounted to move with the element, a pair of spring plungers engageable at opposite sides with the ratchet and alternately effective to store energy during movement of translation of the element and for applying energy to turn the element about its axis upon release of said securing means, means to pivotally supoprt said plungers, means to yieldably hold said plungers in engagement at opposite sides with said ratchet, and means to impart translatory movement to said plunger support in opposition to the translatory movement of said element.

52. In a machine for cutting fur the combination of a reciprocable flat cutting element having a penetrating point and a cutting edge, means to translate the element back and forth between fixed limits, means to secure the element against movement about its axis during back and forth movement and for releasing said element to permit a predetermined degree of such movement upon completion of each back or forth movement, a ratchet member mounted to move with the element, a pair of spring plungers engageable at opposite sides with the ratchet and alternately effective to store energy during movement of translation of the element and for applying energy to turn the element about its axis upon release of said securing means, means to pivotally support said plungers, means to yieldably hold said plungers in engagement at opposite sides with said ratchet, means to impart translatory movement to said plunger support in opposition to the translatory movement of said element, and means to simultaneously vary the degree of movement of translation of said element and said plunger support.

HARLEY C. MOULTON.